Aug. 20, 1935.  R. TEATS  2,011,882
TREATING SULPHATE SOLUTIONS OF THALLIUM AND CADMIUM
Original Filed March 29, 1933
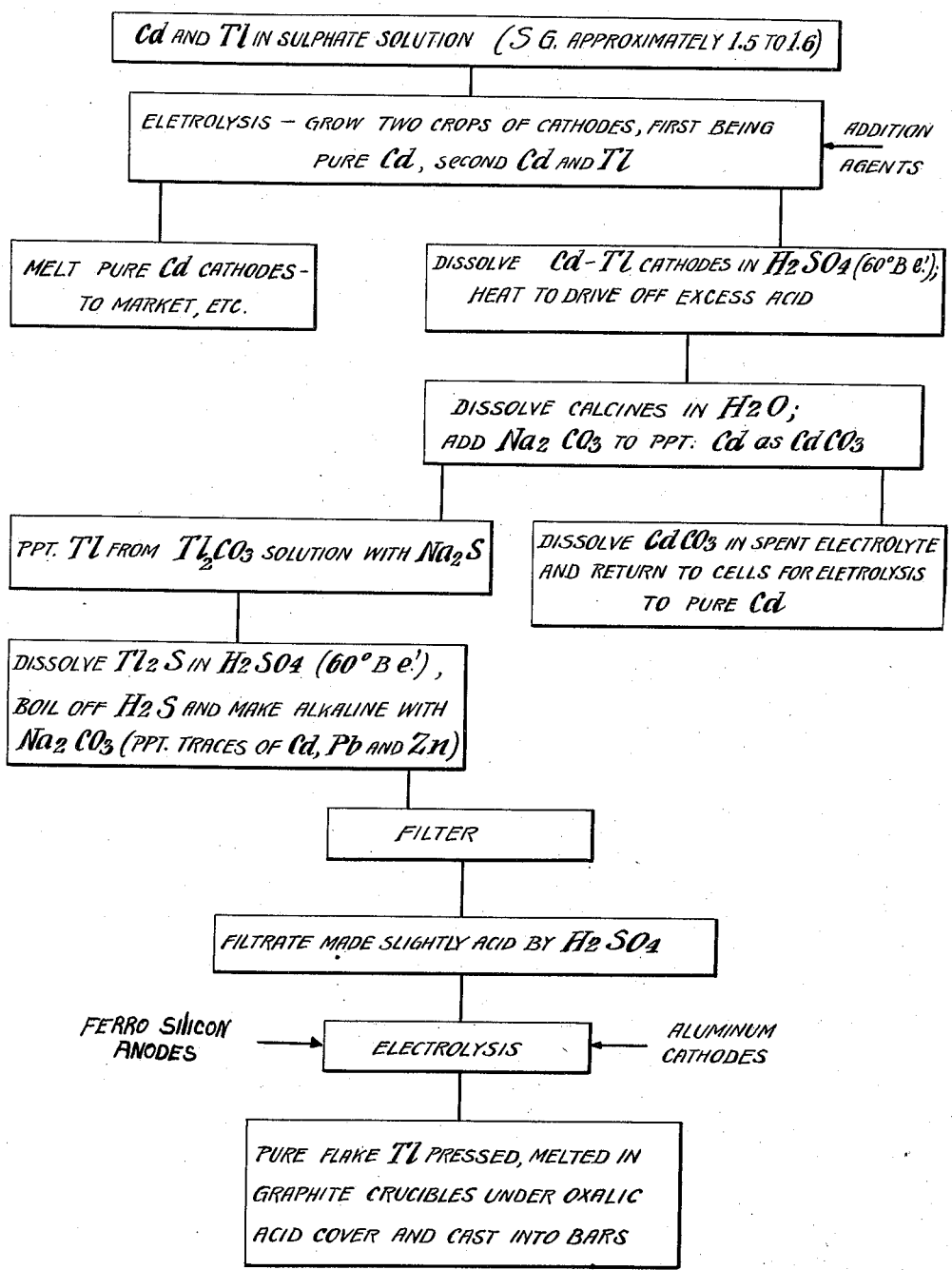
INVENTOR
Roscoe Teats
BY
ATTORNEYS Patented Aug. 20, 1935

2,011,882

UNITED STATES PATENT OFFICE 2,011,882

TREATING SULPHATE SOLUTIONS OF THALLIUM AND CADMIUM

Roscoe Teats, Denver, Colo., assignor to American Smelting and Refining Company, New York, N. Y., a corporation of New Jersey Application March 29, 1933, Serial No. 663,276
Renewed December 7, 1934

9 Claims. (Cl. 204—1)

This invention relates to a process for separating and recovering cadmium and thallium from solutions in which these metals are present in the sulphate form.

The invention provides an electrolytic process for recovering cadmium from cadmium sulphate-thallium sulphate solutions without previous precipitation or removal of the thallium. Among other features of the invention, thallium is initially deposited from the sulphate solution in the form of cadmium-thallium cathodes which are thereafter treated in a novel manner for the separation and recovery of cadmium and thallium.

The invention further consists in the new and novel features of operation and the new and original arrangements and combinations of steps in the process hereinafter described and more particularly set forth in the claims.

The flow sheet accompanying and forming part of the present specification illustrates one manner in which the present invention may be practiced.

In accordance with the present invention, the cadmium sulphate-thallium sulphate solution is subjected to electrolysis, preferably in the presence of suitable addition agents, for the production of pure cadmium cathodes. When the electrolysis has proceeded to a predetermined point, the cathodes of pure cadmium are removed and the remaining cadmium and all of the thallium in the electrolyte deposited as a new or second crop of cathodes. The cadmium-thallium cathodes are then dissolved in sulphuric acid, calcined and the calcines dissolved in water. The cadmium is then precipitated from the solution as cadmium carbonate which may be dissolved in spent electrolyte and subjected to electrolysis for the production of pure cadmium cathodes.

The solution containing the thallium is then suitably treated to precipitate the thallium as thallium sulphide which is subsequently dissolved in sulphuric acid and appropriately treated for the removal of traces of contaminants, such as cadmium, lead and zinc. The purified thallium solution is then suitably electrolyzed for the production of pure flake thallium which may be melted and cast into bars of the pure metal.

While the method for producing the cadmium sulphate-thallium sulphate solution forms no part of the present invention, as obviously such solution may be formed in various manners, one method for producing such a solution is set forth for purposes of illustration. For example, the cadmium sulphate-thallium sulphate solution may be formed by treating crude cadmium dust containing thallium with sulphuric acid, calcining the sulphated mass and leaching the calcines in the presence of cadmium sulphides thereby precipitating impurities, such as silver, bismuth, copper, mercury, lead, zinc, etc., as sulphides and yielding cadmium and thallium in sulphate solution. Arsenic, if present, may be removed by adding ferrous sulphate to the solution, oxidizing the iron with sodium chlorate and precipitating ferric hydroxide which carries the arsenic down with it. By this method, a strong cadmium sulphate-thallium sulphate solution having a specific gravity of from 1.5 to 1.6 may be obtained and utilized as the source of cadmium-thallium sulphate solution in practising the present invention.

In order to more fully explain and illustrate the present invention, its advantages and the various steps in the process, attention is directed to the following description of one manner in which the invention may be commercially practised. In this embodiment of the invention the cadmium sulphate-thallium sulphate solution, practically free from metallic impurities, may be placed in an electrolytic cell and subjected to electrolysis in the presence of suitable addition agents, such as organic compounds which prevent mist from arising from the surface of the electrolyte by suitable froth formation and manganese dioxide (or other compounds yielding manganese in solution) which keeps lead from building up on the cathodes. This electrolysis is appropriately conducted at five amperes current density per square foot of cathode surface using anodes of ferro silicon and cadmium cathodes.

As a result, cadmium is deposited in a pure state at the cathodes in spite of the fact that the electrolyte contains considerable quantities of thallium. The electrolysis is preferably continued to a point at which thallium would be deposited on the cathode if electrolysis were continued. This will occur when the concentration of thallium in the electrolyte approximates one-tenth that of the remaining cadmium. At this point, the pure cadmium cathodes may be removed from the cells and the remaining cadmium and all of the thallium deposited on a second crop of cathodes by continuing the electrolysis. This electrolysis is appropriately conducted using aluminum cathodes and, if desired, a lesser number of cathodes may be employed. For example, the time required for stripping the electrolyte may be materially reduced by using one half the number of cathodes and a current density of ten amperes per square foot of cathode surface.

The cadmium-thallium cathodes may then be dissolved in sulphuric acid (60° Baumé), heated to drive off excess acid and the calcines dissolved in water. A separation of the cadmium from the thallium is effected by adding sodium carbonate to the solution thereby precipitating cadmium carbonate which may be dissolved in spent electrolyte and subjected to electrolysis for the production of pure cathode cadmium.

Thallium is next precipitated from the solution which may be accomplished by adding sodium sulphide thereto. The thallium sulphide is then dissolved in sulphuric acid, the solution boiled to drive off hydrogen sulphide and traces of impurities, such as cadmium, lead and zinc, precipitated by making the solution alkaline with sodium carbonate. The solution is then filtered and the filtrate made acid with sulphuric acid, after which it is utilized as an electrolyte for the electrodeposition of thallium. The electrolysis may be conducted in a suitable electrolytic cell employing ferro-silicon anodes and aluminum cathodes. The pure flake thallium will deposit upon the cathodes from which it may be scraped and kept under water to prevent oxidation. When sufficient thallium has been obtained, it may be pressed and melted in graphite crucibles under a cover of oxalic acid to prevent oxidation and cast into bars. Such bars have an average purity of 99.9% or more.

The use of anodes of ferro-silicon in the electrolysis of the thallium solution presents a distinct improvement in that all of the thallium is deposited on the cathodes. When other anodes, such as lead anodes, for example, are employed, a considerable portion of the thallium (often as much as one-half of the entire thallium content of the electrolyte) is deposited on the anodes.

It will be appreciated that by the present invention the bulk of the cadmium in cadmium-thallium sulphate solutions, such as are ordinarily met with in commercial metallurgical practice, may be recovered electrolytically as pure cadmium without previously removing the thallium from the solution. The invention also facilitates the recovery of thallium by materially reducing the amount of material which must be treated and provides a simple and cleancut process for separating the thallium from cadmium in concentrated solution. These and other features make the present invention a highly successful and commercial process.

While certain novel features of the invention have been disclosed and are pointed out in the annexed claims, it will be understood that various omissions, substitutions and changes may be made by those skilled in the art without departing from the spirit of the invention.

What is claimed is:

1. The method of treating a cadmium sulphate-thallium sulphate solution which comprises subjecting same to electrolysis for a period of time sufficient to deposit the bulk of the cadmium as pure cadmium cathodes, removing said cathodes, continuing the electrolysis to deposit the remaining cadmium and all of the thallium as a second crop of cathodes, dissolving the cadmium-thallium cathodes in sulphuric acid, calcining same, dissolving the calcines in water and precipitating cadmium therefrom as cadmium carbonate.

2. The method of treating a cadmium sulphate-thallium sulphate solution which comprises subjecting same to electrolysis for a period of time sufficient to deposit the bulk of the cadmium as pure cadmium cathodes, removing said cathodes, continuing the electrolysis to deposit the remaining cadmium and all of the thallium as a second crop of cathodes, dissolving the cadmium-thallium cathodes in sulphuric acid, calcining same, dissolving the calcines in water, precipitating cadmium therefrom as cadmium carbonate, dissolving said cadmium carbonate in spent electrolyte and electrolyzing the resulting solution thereby producing pure cathode cadmium.

3. The method of treating a cadmium sulphate-thallium sulphate solution which comprises subjecting same to electrolysis for a period of time sufficient to deposit the bulk of the cadmium as pure cadmium cathodes, removing said cathodes, continuing the electrolysis to deposit the remaining cadmium and all of the thallium as a second crop of cathodes, dissolving the cadmium-thallium cathodes in sulphuric acid, calcining same, dissolving the calcines in water, precipitating cadmium therefrom as cadmium carbonate, removing same from the solution, precipitating thallium from the solution as thallium sulphide, dissolving said thallium sulphide in sulphuric acid, expelling hydrogen sulphide from the solution, precipitating impurities from said solution as carbonates and utilizing the purified thallium solution as an electrolyte for the production of pure thallium.

4. The method of separating and recovering cadmium and thallium from a cadmium-thallium sulphate solution which comprises electrolyzing such solution to a point at which the concentration of thallium approximates one-tenth that of cadmium in the electrolyte, removing pure cadmium cathodes, depositing the remaining cadmium and all of the thallium as a second crop of cathodes, dissolving said cadmium-thallium cathodes in sulphuric acid, heating the solution to drive off excess acid, dissolving the resulting calcines in water and effecting a separation between the cadmium and thallium by precipitating the former with sodium carbonate.

5. The method of separating a mixture of metallic cadmium and thallium which comprises dissolving same in sulphuric acid, heating the resulting acid solution to drive off excess acid, dissolving the calcines in water and precipitating cadmium from such solution as cadmium carbonate.

6. The method of recovering thallium from a cadmium-thallium sulphate solution which comprises removing the bulk of the cadmium as pure cathode cadmium, producing a second crop of cathodes containing all of the thallium and remaining cadmium, dissolving said second cathodes in sulphuric acid, calcining same, dissolving the calcines in water, precipitating cadmium from the solution as cadmium carbonate, removing same, precipitating thallium from the solution with sodium sulphide, dissolving the resulting thallium sulphide in sulphuric acid, expelling hydrogen sulphide from the solution, precipitating impurities from said solution by adding sodium carbonate thereto, filtering the solution, adding sulphuric acid to the filtrate in quantities sufficient to render same slightly acid and utilizing the resulting solution as an electrolyte for the electrodeposition of pure thallium.

7. The method of recovering thallium from thallium carbonate solution which comprises precipitating the thallium as thallium sulphide, dissolving the precipitate in sulphuric acid, boiling the solution to drive off hydrogen sulphide, precipitating traces of cadmium, lead and zinc from the solution by adding sodium carbonate thereto, filtering the solution, rendering the filtrate acid by adding sulphuric acid thereto and subjecting said solution to electrolysis in the presence of aluminum cathodes whereby pure flake thallium is deposited on said cathodes.

8. The process according to claim 7 in which anodes of ferro-silicon are employed in the electrolytic step.

9. The process for treating a solution containing cadmium sulphate and thallium sulphate which comprises subjecting said solution to electrolysis thereby obtaining a first cathode deposit of cadmium free from thallium, discontinuing the electrolysis before the thallium content of the electrolyte materially exceeds approximately one-tenth the cadmium content thereof and thereafter recovering the thallium and remaining cadmium from the electrolyte as a second cathode deposit.

ROSCOE TEATS.